United States Patent [19]

Esser

[11] Patent Number: 5,275,440
[45] Date of Patent: Jan. 4, 1994

[54] DOUBLE-LAYER PIPE BEND WITH INTERMEDIATE SUPPORT LAYER

[75] Inventor: Alexander Esser, Warstein, Fed. Rep. of Germany

[73] Assignee: Esser-Brieden GmbH & Co. KG, Warstein, Fed. Rep. of Germany

[21] Appl. No.: 746,250

[22] Filed: Aug. 15, 1991

[51] Int. Cl.⁵ .................................. F16L 58/02
[52] U.S. Cl. ........................... 285/16; 406/193; 285/55; 285/179; 285/416; 138/149
[58] Field of Search ............... 285/16, 17, 55, 127, 285/179, 55, 286, 416, 15; 406/193; 138/147, 149

[56] References Cited

U.S. PATENT DOCUMENTS

| | | | |
|---|---|---|---|
| 1,303,102 | 5/1919 | Monrath | 285/55 |
| 2,360,427 | 10/1944 | Lapp | 285/55 |
| 3,284,106 | 11/1966 | McIntosh | 285/55 |
| 3,347,568 | 10/1967 | Weeden, Jr. | 285/55 |
| 4,365,404 | 12/1982 | Castro et al. | 285/55 X |
| 4,478,253 | 10/1984 | Everett | 406/193 |
| 4,554,721 | 11/1985 | Carty et al. | 406/193 |
| 4,684,155 | 8/1987 | Davis | 285/55 X |
| 4,804,207 | 2/1989 | Berchem et al. | 285/16 |
| 5,044,670 | 9/1991 | Esser | 285/16 |

FOREIGN PATENT DOCUMENTS

| | | | |
|---|---|---|---|
| 867383 | 2/1953 | Fed. Rep. of Germany | 285/16 |
| 1071432 | 12/1959 | Fed. Rep. of Germany | 285/16 |
| 3524757 | 1/1987 | Fed. Rep. of Germany | 406/193 |
| 3814035 | 9/1989 | Fed. Rep. of Germany | 406/193 |

Primary Examiner—Eric K. Nicholson
Attorney, Agent, or Firm—Anderson Kill Olick & Oshinsky

[57] ABSTRACT

A double-layer pipe bend for a pipeline includes an inner pipe of cast steel, an outer pipe of weldable steel surrounding the inner pipe, and connecting flanges at the ends of the pipe bend. The connecting flanges are welded to the outer pipe. The inner pipe and the outer pipe are formed such that a pressure-compensating layer can be formed by the transported medium between the pipes. Another pressure-compensating layer can form between an inner wearing ring and an outer coupling ring of each connecting flange. The wearing ring and, thus, the inner pipe, is axially secured by a groove in the wearing ring and a radial collar in the coupling ring.

9 Claims, 2 Drawing Sheets

DOUBLE-LAYER PIPE BEND WITH INTERMEDIATE SUPPORT LAYER

BACKGROUND OF THE INVENTION

1. Field of the Invention

The present invention relates to a double-layer pipe bend for a pipeline for transporting solids, particularly concrete, to which liquids have been admixed. The pipe bend includes a wear-resistant inner pipe and an outer pipe of weldable material surrounding the inner pipe. Connecting flanges at the ends of the pipe bend are welded to the outer pipe. The outer diameter of the inner pipe and the inner diameter of the outer pipe are selected in such a way that the inner pipe can be inserted in the outer pipe without deformation. An intermediate layer which supports the inner pipe is provided between the outer pipe and the inner pipe.

2. Description of the Related Art

The magazine "Maschinenmarkt", Würzburg, 84 (1978) 12 discloses on page 200, FIG. 5, and in the left and center column on page 201 describing FIG. 5, a double-layer pipe bend for a pipeline for transporting solids, particularly concrete, to which liquids have been admixed, wherein the pipe bend is composed of a lining element of artificial basalt, of a thin-walled steel pipe surrounding the lining element and connecting flanges at the ends which are apparently welded to the steel pipe.

The outer diameter of the lining element and the inner diameter of the steel pipe are selected in such a way that the lining element can be inserted in the steel pipe without deformation. In addition, a mortar layer is provided between the steel pipe and the lining element for supporting the lining element in the steel pipe.

The pipe bend described above has the disadvantage that it is difficult to mount the lining element in the steel pipe by means of the hardening mortar because the mortar is applied to the lining element hydraulically with an special method which, however, is not described in detail.

The known pipe bend has the further disadvantage that, due to the friction between the transported medium and the lining element, the lining element can be displaced in axial direction of a pipeline relative to the steel pipe. This axial displacement of the lining element relative to the steel pipe may then lead to a mortise joint-type connection between successive pipe bends or between a pipe bend and a straight pipe. As a result, it is nearly impossible to remove a pipe bend from a pipe line radially as it is repeatedly required in practical operation. Even if the requirement is met that several pipes can be removed from a pipeline with at least one pipe bend although only the pipe bend has to be removed, there still is the problem that portions of the axially displaced lining elements project freely axially beyond the steel pipes. These portions are of a very sensitive material and, therefore, are extremely susceptible to being damaged, particularly in view of the fact that the pipe bend is subjected to high loads during operation.

In addition, if there are several axially displaced lining elements, it is possible that at the rearward end of the displaced lining elements in conveying direction an extremely wide gap is formed between a lining element which has not yet been displaced and the next already displaced lining element. Accordingly, in the area of the gap there is the increased danger of turbulence of the transported medium which, in turn, leads to extremely high wear.

The known pipe bend has the further disadvantage that the wall thicknesses of the line element are the same in all areas. As a result, it is not possible to take into account the particular operating conditions of those pipe bends which are located at the conveying end of a concrete conveying arrangement which includes pipe sections with several bends, such as, self-propelled concrete pumps. This is because these pipe bends are subjected to strong impact-like loads by the concrete which is transported through the pipe lines. Consequently, these pipe bends have a significantly shorter service life than the adjacent straight pipe sections.

German Offenlegungsschrift 33 15 819 discloses a straight pipe element composed of an outer steel pipe and a pipe of plastic material inserted in the steel pipe. The annular gap between the plastic pipe and the outer steel pipe is filled by a hardening filler material. In addition, a flange is arranged at each end of the steel pipe. One end of the plastic pipe is extended over a sleeve at the other end of the steel pipe.

German patent 8 05 637 discloses a pipe bend for stowing lines composed of three segments. Each individual segment has a wearing insert of asymmetrical wall thickness which is supported by two housing halves of equal construction which can be coupled to each other by means of snap closures. The housing halves are to be made of light metal.

German Auslegeschrift 10 95 768 shows the connection between two double-layer pneumatic stowing pipes. The material of the two layers is not described. It is also not described how the inner layer can be inserted in the outer layer without deformation.

SUMMARY OF THE INVENTION

Therefore, it is the object of the present invention to improve a double-layer pipe bend of the above-described type in such a way that its service life is significantly extended while it can be used for a greater variety of purposes and is less complicated to manufacture. In addition, it is to be ensured that the pipe bend can be removed radially without problem from a closed pipe line.

In accordance with the present invention, in a double-layer pipe bend of the above-described type, the length of the inner pipe is selected in such a way that the inner pipe is axially held between the connecting flanges, the inner pipe is at least partially embedded in a pressure-compensating layer formed by the transported medium, and the wall of the inner pipe is dimensioned relative to the center of curvature of the pipe bend so as to be thicker in the radially outer pipe portions which are subjected to a higher load by the transported medium than in the radially inner pipe portions which are subjected to lower loads by the transported medium.

An important aspect of the present invention is the fact that the inner pipe is now constructed relative to the outer pipe in such a way that the transported medium, particularly concrete, can itself serve to protect the inner pipe. Thus, due to the gaps between the connecting flanges and the inner pipe resulting from the dimensions of the inner pipe relative to the outer pipe and to the connecting flanges, the transported medium can reach between the inner pipe and the outer pipe and, consequently, can form the pressure compensating-layer for protecting the inner pipe. As a result, the inner pipe is essentially embedded in the transported medium. Consequently, independently of its consistency, the transported medium flowing in the inner pipe can no longer exert forces on the inner pipe which could lead to cracks or even ruptures of the inner pipe. A pressure compensation between the outer and inner surfaces of the wall of the inner pipe is always present. Consequently, with the exception of wear due to friction, the pipe wall is not subjected to any additional harmful loads.

The selection of the material of the inner pipe now also no longer constitutes a problem. Thus, the material of the inner pipe can always be selected in an optimum manner for each type of use.

In addition, the wall thickness of the inner pipe, particularly if made of cast steel, can now be specifically adapted for each type of use. Accordingly, those portions can be made with greater thicknesses which are subjected to greater wear because of the curvature of the pipe. These are the points which are located radially farthest remote from the center of curvature of the pipe bend. Consequently, it is possible in an advantageous manner to reduce the amount of material used for the inner pipe depending on the type of application.

Since the inner pipe is embedded in a pressure compensating layer formed by the transported medium, the inner pipe is mounted in such a way that it is free of impact-type loads. Since the inner pipe is embedded in the pressure-compensating layer, it is essentially only subjected to the inner friction wear. Thus, the service life of a pipe bend equipped with the inner pipe according to the present invention and used as an end section of a pipeline for a self-propelled concrete pump can be adapted to the service life of the other pipeline sections which are subjected to lower loads.

Finally, since the inner pipe is exactly fixed in the outer pipe, it is easily possible to radially remove a pipe bend from a pipeline and to mount a new pipe bend in the pipeline.

Accordingly, all the features of the present invention described above are necessary to obtain the effects mentioned above.

In accordance with an advantageous further development of the present invention, at least one of the connecting flanges is composed of an outer coupling ring welded to the outer pipe and of an inner wearing ring. A short axial portion of the coupling ring of the connecting flange which is otherwise arranged on the end faces of the outer pipe and the inner pipe extends over and is welded to the outer pipe.

As a result, any unnecessary material for the connecting flange is avoided, particularly for the coupling ring which is of a weldable steel. In addition, centering of the outer pipe and of the inner pipe in the axial portion of the coupling ring is significantly simplified. Depending on the type of use, one such connecting flange may be sufficient. However, connecting flanges of this type may frequently be useful at both ends.

The wearing ring may be fixed in the coupling ring in a conventional manner, for example, by hardening it once or several times. However, in accordance with another advantageous feature of the present invention, the wearing ring can also be embedded in a pressure-compensating layer formed by the transported medium between the wearing ring and the coupling ring and the wearing ring may be axially fixed in its position by means of a radial undercut and/or a collar on the coupling ring. Thus, the radial undercut and/or the collar on the coupling ring and/or on the wearing ring serves to fix the wearing ring axially, while the pressure-compensating layer formed by the transported medium ensures that the wearing ring is safely embedded in the coupling ring.

In accordance with another feature of the present invention, the connecting flange extends over the outer pipe at least at one end of the outer pipe and is welded to the end face of the outer pipe which faces toward the center of the pipe, wherein the connecting flange extends with a radial collar along the end face of the outer pipe and at least partially over the end face of the inner pipe. Thus, the inwardly directed narrow radial collar can extend along the end faces of the outer pipe and of the inner pipe to the inner diameter of the inner pipe. However, it is also conceivable that the radial collar extends over the end face of the outer pipe but in a recess on the circumference of the inner pipe. The end faces of the radial collar and of the inner pipe are then located in the same radial plane. Of course, this type of construction can be provided on both ends of the pipe bend.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

DESCRIPTION OF THE PREFERRED EMBODIMENTS

Figure 1:
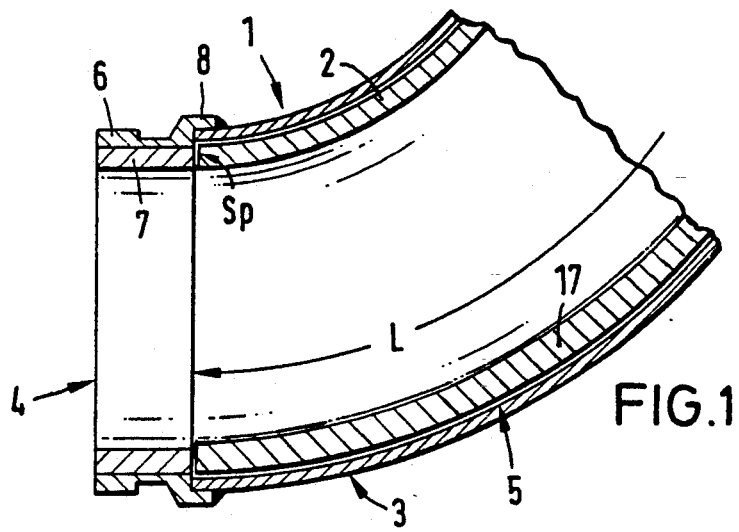
FIG. 1 is a vertical longitudinal sectional view of an end portion of double-layer pipe bend according to the present invention.

In FIGS. 1-5 of the drawing, reference numerals 1 or 1a, 1b, 1c, 1d denote a double-layer pipe bend for transporting concrete. The pipe bend 1, 1a-1d is combined with other pipe bends 1, 1a-1d or straight pipes to form a pipeline. Such a pipeline with several bends is preferably used in so-called self-propelled concrete pumps.

Each pipe bend 1, 1a-1d is composed of an inner pipe 2 of cast steel, of an outer pipe 3 of weldable material surrounding the inner pipe 2, and of connecting flanges 4, 4a-4d at the ends which flanges are welded to the outer pipe 3.

The outer diameter of the inner pipe 2 and the inner diameter of the outer pipe 3 are selected specifically relative to each other and the length L of the inner pipe 2 between the connecting flanges 4, 4a-4d at the ends are dimensioned in such a way that the previously processed inner pipe 2 can be inserted into the outer pipe 3 without deformation. Subsequently, the connecting flanges 4, 4a-4d at the ends are slid at the end faces over the outer pipe 3 and are then welded thereto.

Gaps are formed between the outer pipe 3 and the inner pipe 2. The concrete can travel through gaps Sp at the end faces and, consequently, can form a pressure-compensating layer 5 between the outer pipe 3 and the inner pipe 2. In other words, in operation the inner pipe 2 is essentially embedded in the pressure-compensating layer 5 and, consequently, is subjected to the same pressures on the inside and on the outside.

Figure 2:
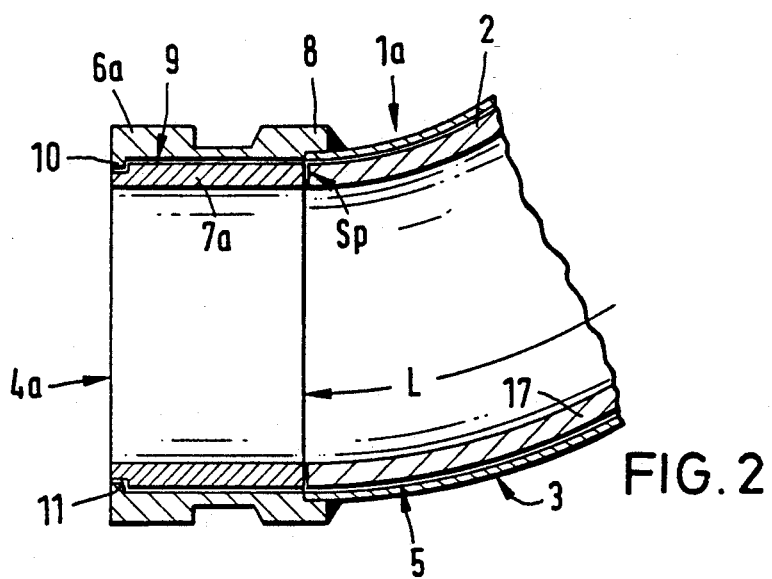
FIG. 2 is a vertical sectional view of an end portion of a second embodiment of the double-layer pipe bend according to the present invention.
Figure 3:
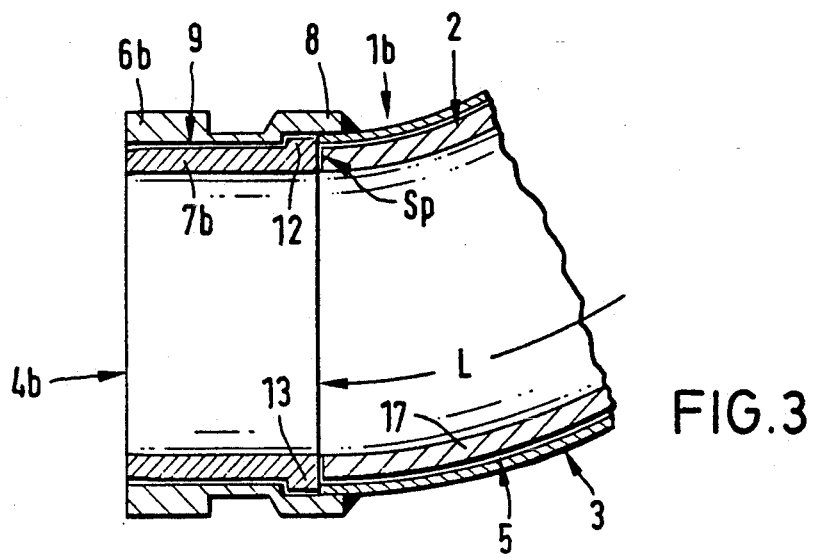
FIG. 3 is a vertical sectional view of an end portion of a third embodiment of the double-layer pipe bend according to the present invention.

FIGS. 1-3 of the drawing show embodiments in which the connecting flanges 4, 4a, 4b are each formed by a outer coupling ring 6, 6a, 6b welded to the outer pipe 3 and of an inner wearing ring 7, 7a, 7b. The coupling rings 6, 6a, 6b have short axial portions 8 with which they extend over the outer pipe 3. The end faces of the portions 8 are welded to the circumferential surfaces of the outer pipe 3.

In the embodiment of FIG. 1, the wearing ring 7 is immovably fixed in the coupling ring 4 by hardening the ring once or several times.

In the embodiment of FIG. 2, the wearing ring 7a is embedded in a pressure-compensating layer 9 which can be formed during operation from the coupling gap or from the gap Sp between the wearing ring 7a and the coupling ring 6a.

The coupling ring 6a has at the free end thereof an inwardly directed radial collar 10 which engages in a circumferential groove 11 of the wearing ring 7a, so that the wearing ring 7a is axially fixed in this manner.

In the embodiment of FIG. 3, the coupling ring 6b has in the vicinity of the portion 8 an undercut 12 which is engaged by a radial collar 13 of the wearing ring 7b. In this manner, the wearing ring 7b is axially secured in the coupling ring 6b. It can also be seen that the concrete between the coupling ring 6b and the wearing ring 7b can build up during operation from the coupling gap or the gap Sp a pressure-compensating layer 9 in which the wearing ring 7b is essentially embedded.

Of course, it is conceivable that, if required, both types of fastening of the wearing rings 7a, 7b according to FIGS. 2 and 3 can be used simultaneously.

Figure 4:
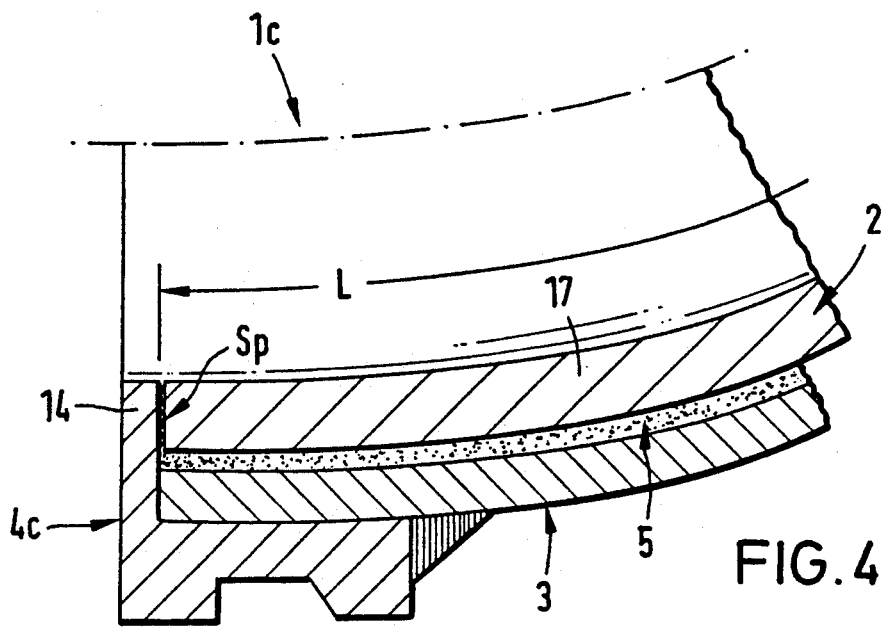
FIG. 4 is a vertical sectional view of an end portion of a fourth embodiment of the double-layer pipe bend according to the present invention.
Figure 5:
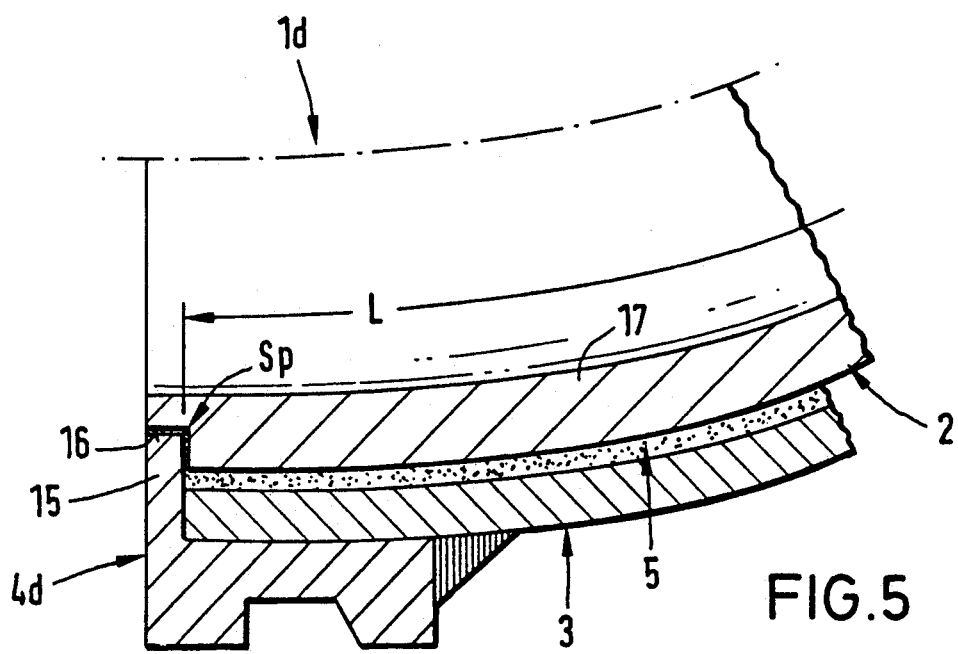
FIG. 5 is a vertical sectional view of an end portion of a fifth embodiment of the double-layer pipe bend according to the present invention.

The embodiments of FIGS. 4 and 5 have connecting flanges 4c, 4d without wearing rings. As can be seen in FIG. 4, the connecting flange 4c which is of weldable steel has a radially inwardly directed collar 14 which extends on the end faces of the outer pipe 3 and the inner pipe 2. The inner diameter of the connecting flange 4c corresponds to the inner diameter of the inner pipe 2. The axial length of the connecting flange 4c is a multiple of the width of the narrow radial collar 14.

In the embodiment of FIG. 5, the narrow radial collar 15 of the connecting flange 4d extends radially in such a way that it extends along the end face of the outer pipe 3, but engages only in a circumferential groove 16 in the edge of the inner pipe 2. The axial length of the connecting flange 4d is also a multiple of the width of the radial collar 15.

In the embodiment of FIG. 4 as well as in the embodiment FIG. 5, the end faces of the connecting flanges 4c, 4d directed toward the longitudinal center of the pipe are welded to the outer circumferential surfaces of the outer pipe 3.

Finally, FIGS. 1-5 show that the thickness of the pipe wall 17 of the inner pipe 2 in the radially outer pipe portions relative to the center of curvature of the pipe bends 1, 1a-1d is greater than the thickness of the pipe wall 17 in the radially inner pipe portions. Accordingly, it is taken into account that the radially outer pipe portions are subjected to substantially greater wear by the concrete than are the radially inner pipe portions. The wall thickness may also vary in axial direction of the pipe bends 1, 1a-1d in dependence upon differently occurring loads.

While specific embodiments of the invention have been shown and described in detail to illustrate the inventive principles, it will be understood that the invention may be embodied otherwise without departing from such principles.

I claim:

1. A double-layer pipe bend for a pipeline for transporting solids to which liquids have been admixed, comprising:
   a wear-resistant inner pipe;
   an outer pipe of weldable material surrounding the inner pipe; the inner pipe having an outer diameter and the outer pipe having an inner diameter, the outer diameter of the inner pipe and the inner diameter of the outer pipe being selected such that the inner pipe is insertable in the outer pipe without deformation;
   connecting flanges at ends of the pipe bend welded to the outer pipe, wherein the inner pipe has a length such that it is axially fixed between the connecting flanges;
   an intermediate layer which supports the inner pipe between the outer pipe and the inner pipe, wherein said inner pipe is at least partially embedded in said layer;
   a radially outer pipe portion and a radially inner pipe portion on said pipe bend,
   a greater wall thickness in said outer pipe portion than in said inner pipe portion wherein said outer portion is subjected to a higher load by the mixture; and
   said inner portion is subjected to lower loads by the mixture.

2. The pipe bend of claim 1, wherein at least one of the connecting flanges comprises,
   the outer coupling ring welded to the outer pipe, wherein said coupling ring has a short axial portion which extends over and is welded to the outer pipe; and
   an inner wearing ring.

3. The pipe bend of claim 2, further comprising:
   a second pressure-compensating layer formed by the mixture between the wearing ring and the coupling ring;
   wherein the wearing ring is embedded in said second layer; and,
   a radial undercut of said coupling ring and radial undercut.

4. The pipe bend of claim 2, further comprising:
   a second pressure-compensating layer formed by the mixture between the wearing ring and the coupling ring, wherein the wearing ring is embedded in said second layer; and
   a collar of the coupling ring, wherein the wearing ring is fixed in axial position by said collar.

5. The pipe bend of claim 1, further comprising:
   an end face of the outer pipe,
   wherein the connecting flange extends over the outer pipe at least at one end of the outer pipe and is welded to said face of the outer pipe which faces toward the center of the pipe; and a radial collar along said end face, wherein the connecting flange extends with said radial collar along the end face of the outer pipe; and an end face of the inner pipe, wherein said connective flange extends at least partially over said end face of the inner pipe.

6. A double-layer pipe bend for a pipeline for transporting solids to which liquids have been admixed, comprising:

a wear resistant inner pipe;

an outer pipe of weldable material surrounding the inner pipe, the inner pipe having an outer diameter and the outer pipe having an inner diameter, the outer diameter of the inner pipe and the inner diameter of the outer pipe being selected such that the inner pipe is insertable in the outer pipe without deformation;

connecting flanges at ends of the pipe bend welded to the outer pipe, wherein the inner pipe has a length such that it is axially fixed between the connecting flanges, wherein at least one of the connecting flanges comprises an outer coupling ring welded to the outer pipe wherein said coupling ring has a short axial portion which extends over and is welded to the outer pipe;

an intermediate layer which supports the inner pipe between the outer pipe and the inner pipe, wherein said inner pipe is at least partially embedded in said layer;

a radially outer pipe portion and a radially inner pipe portion on said pipe bend;

a greater wall thickness in said outer pipe portion than in said inner pipe portion wherein said outer portion is subjected to a higher load by the mixture; and said inner portion is subjected to lower loads by the mixture.

7. The pipe bend of claim 6, further comprising:

a second pressure-compensating layer formed by the mixture between the wearing ring and the coupling ring;

wherein the wearing ring is embedded in said second layer; and a radial undercut of said coupling ring and radial undercut.

8. The pipe bend of claim 6, further comprising:

a second pressure-compensating layer formed by the mixture between the wearing ring and the coupling ring, wherein the wearing ring is embedded in said second layer; and a collar of the coupling ring, wherein the wearing ring is fixed in axial position by said collar.

9. The pipe bend of claim 5, further comprising:

an end face of the outer pipe;

wherein the connecting flange extends over the outer pipe at least at one end of the outer pipe and is welded to said face of the outer pipe which faces toward the center of the pipe;

a radial collar along said end face, wherein the connecting flange extends with said radial collar along the end face of the outer pipe; and an end face of the inner pipe, wherein said connective flange extends at least partially over said end face of the inner pipe.

* * * * *